United States Patent Office 2,934,553
Patented Apr. 26, 1960

2,934,553
THIOSULFATE SURFACTANT

Edward L. Doerr, Dayton, Ohio, assignor to Monsanto Chemical Company, St. Louis, Mo., a corporation of Delaware No Drawing. Application May 21, 1958
Serial No. 736,689

1 Claim. (Cl. 260—453)

The present invention relates to surfactants and more particularly provides alkali metal thiosulfates as new compounds which possess a high degree of utility as detersive and lathering agents.

In my application, Serial No. 599,347, filed July 23, 1956, now U.S. Patent No. 2,892,861, I have disclosed alkali metal or ammonium salts of branched chain alkyl thiosulfates having from 12 to 16 carbon atoms in the alkyl radical. While these branched chain compounds show especially low and therefore advantageous wetting-out speeds when aqueous solutions thereof are tested by the Draves test, these products have been found to be somewhat deficient in detergency and lathering. I have now found that the heretofore unknown metal salts of n-tridecyl thiosulfate are of outstanding value, not only for the purpose of assisting in the wetting of textile materials, but also because they possess outstanding detersive and lathering properties. They are particularly valuable as dishwashing agents.

The present salts of n-tridecyl thiosulfate are obtained by the reaction of an n-tridecyl halide with an alkali metal thiosulfate substantially according to the scheme:

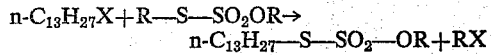

in which X is halogen and R is alkali metal.

The presently useful n-tridecyl halides include n-tridecyl bromide, n-tridecyl chloride and n-tridecyl iodide. The presently useful inorganic thiosulfates include sodium, potassium or lithium thiosulfates. Reaction of the n-tridecyl halide with the alkali metal thiosulfate takes place readily by heating a mixture of the two reactants at a temperature of, say, from 50° C. to 150° C. in the presence or absence of an inert diluent or solvent. Refluxing temperatures are preferred. For smooth reaction a liquid diluent is generally recommended. Conveniently this may be a mixture of solvents for the inorganic and organic constituents of the reaction mixture, e.g., a mixture of water and an organic liquid such as ethanol, isopropanol, benzene, acetone, ethyl ether, etc. The by-product alkali metal halide is readily removed from the reaction mixture either by decantation and/or alternate concentration, dissolution and precipitation. The residue comprises the alkali metal n-tridecyl thiosulfate and solvent in case it was employed as well as alkyl halide if an excess of said halide had been used. The solvent and alkyl halide may be readily removed by distillation or by other appropriate means known to those skilled in the art.

The present alkali metal n-tridecyl thiosulfates are stable, well characterized crystalline to somewhat waxy solids which, as hereinbefore stated are particularly valuable in that they possess an unusual combination of detersive, lathering and wetting-out properties. They thus find wide application in a large number of industrial processes, especially in those relating to the treatment of textiles, leather and other fibrous materials. They are particularly valuable for laundering and in dishwashing in that they possess high cleansing and lathering efficiency in both hard and soft water as well as in the presence of fatty solids.

The invention is further illustrated, but not limited, by the following examples:

Example 1

A mixture consisting of 105.3 g. (0.4 mole) of n-tridecyl bromide, 129.0 g. of sodium thiosulfate pentahydrate, 300 g. of ethanol and 100 g. of water was charged to a 1-liter reactor which was equipped with stirrer, thermometer and reflux condensor. The whole was brought to refluxing temperatures and refluxing was continued for a total of 6 hours. The resulting reaction mixture was allowed to cool and stratify. Most of the lower, aqueous layer was removed with a pipette. Then after stripping the solvent from the residue, isopropanol was added to the stripped residue to replace said solvent, and the resulting mixture was filtered while hot to remove inorganic salts. The crystals which were obtained from the filtrate upon cooling were filtered off and dissolved in hot water. The resulting solution was treated with a filter aid, filtered and the filtrate cooled to give crystals of the product. Recrystallization from water and drying for 20 hours in a vacuum oven at 40° C. gave 64.9 g. of the snow white crystalline sodium n-tridecyl thiosulfate.

Example 2

This example provides a comparison of the surfactant properties of the sodium n-tridecyl thiosulfate of Example 1 with those of other sodium alkyl thiosulfates.

Testing of the detersive efficiency of the compounds shown below was conducted by the method described by Jay C. Harris and Earl L. Brown in the Journal of the American Oil Chemists' Society, 27, 135–143 (1950), in which method the detergency of materials is compared with the detergency of Gardinol WA, a commercial detergent produced by sulfating the mixture of alcohols, principally $C_{12}$, obtainable by hydrogenation of coconut oil fatty acids. The following results were obtained in water of 300 p.p.m. hardness on "built" compositions consisting of 40% by weight of a mixture of sodium tripolyphosphate and sodium tetrapyrophosphate, 25% sodium silicate, 20% soda ash, and 15% of one of the compounds shown in the table below under "Sodium Alkyl Thiosulfate Tested":

| Sodium Alkyl Thiosulfate Tested | Detergency, percent of "Gardinol" in water hardness of— | |
|---|---|---|
| | 50 p.p.m. | 300 p.p.m. |
| n-Tridecyl | 118 | 125 |
| Branched Tridecyl | 72 | 71 |
| n-Dodecyl | 83 | 65 |
| 2-Butyloctyl | 78 | 74 |

In the above table, the branched tridecyl radical is the tridecyl radical derived from the branched chain tridecanol prepared according to the "Oxo" process by the high temperature, high pressure reaction of carbon monoxide and hydrogen with propylene tetramer or butylene. From the above tests, it is evident that in water of both 50 p.p.m. and 300 p.p.m. hardness, the sodium n-tridecyl thiosulfate is significantly superior in detersive efficiency to either said sodium branched tridecyl thiosulfate, the n-dodecyl thiosulfate, or the 2-butyloctyl thiosulfate.

Testing of the wetting-out properties by the Draves test of the American Association of Textile Colorists gave the following results:

| Sodium Alkyl Thiosulfate Tested | Speed of Wetting, Seconds at Percent Concentration | |
|---|---|---|
| | 0.062 | 0.031 |
| n-Tridecyl (Ex. 1) | 20.7 | 37.9 |
| Branched tridecyl [1] | 22.6 | 180+ |
| n-Dodecyl | 27.3 | 180+ |
| 2-Butyloctyl | 180+ | |

[1] The same compound used in detergent tests above.

The above data show the sodium n-tridecyl thiosulfate to possess very good wetting-out properties. It is particularly outstanding when employed in the very low concentrations.

Evaluation of lathering properties of the above compounds employing the Ross-Miles Lather Test of the American Society of Testing Materials gave the following results in water of 50 p.p.m. hardness:

| Sodium Alkyl Thiosulfate Tested | At Once | After 5 Min. |
|---|---|---|
| n-Tridecyl (Ex. 1) | 20.0 | 19.2 |
| Branched tridecyl [1] | 14.8 | 3.3 |
| n-Dodecyl | 13.2 | 5.0 |
| 2-Butyloctyl | 4.2 | trace |

[1] The branched tridecyl radical which is derived from the branched chain tridecanol obtained according to the "Oxo" process by the high pressure reaction of propylene tetramer or butylene trimer with carbon monoxide and hydrogen.

The above data show that of the above very closely related compounds, only the sodium n-tridecyl thiosulfate gives a stable, high foam.

This application is a continuation-in-part of my co-pending application, Serial No. 599,348, filed July 23, 1956, and now abandoned.

What I claim is:

Sodium n-tridecyl thiosulfate.

References Cited in the file of this patent

UNITED STATES PATENTS 1,969,612   Kaiser et al. _____ Aug. 7, 1934

FOREIGN PATENTS 417,930   Great Britain _____ Oct. 16, 1934

OTHER REFERENCES

Niven, Jr.: "Fundamentals of Detergency," 1950, p. 50.